United States Patent [19]

Muccitelli

[11] Patent Number: 4,569,783
[45] Date of Patent: Feb. 11, 1986

[54] HYDROQUINONE CATALYZED OXYGEN SCAVENGER AND METHODS OF USE THEREOF

[75] Inventor: John A. Muccitelli, Elkins Park, Pa.

[73] Assignee: Betz Laboratories, Inc., Trevose, Pa.

[21] Appl. No.: 667,237

[22] Filed: Nov. 1, 1984

[51] Int. Cl.$^4$ ................................................. C09K 3/00
[52] U.S. Cl. ................................ 252/188.28; 252/387; 252/393; 252/396; 422/14
[58] Field of Search .................... 252/178.1, 387, 393, 252/396, 188.28; 422/14

[56] References Cited

U.S. PATENT DOCUMENTS

| | | | |
|---|---|---|---|
| 3,843,547 | 10/1974 | Kaufman et al. | 252/188.28 |
| 3,983,048 | 9/1976 | Schiessl et al. | 252/188.28 |
| 4,269,717 | 5/1981 | Slovinsky | 252/188.28 |
| 4,278,635 | 7/1981 | Kerst | 252/393 |
| 4,279,767 | 7/1981 | Muccitelli | 422/14 |
| 4,282,111 | 8/1981 | Ciuba | 422/14 |
| 4,289,645 | 9/1981 | Muccitelli | 252/178 |
| 4,363,734 | 12/1982 | Slovinsky | 252/188.28 |
| 4,487,708 | 12/1984 | Muccitelli | 252/188.28 |

*Primary Examiner*—Lorenzo B. Hayes
*Assistant Examiner*—Willie J. Thompson
*Attorney, Agent, or Firm*—Alexander D. Ricci; Bruce E. Peacock

[57] ABSTRACT

Compositions and methods for chemically scavenging oxygen from an aqueous medium are disclosed. Salicylaldehyde catalyzed by hydroquinone can be used as an oxygen scavenger in any aqueous medium, but is especially well adapted for use in boiler water systems.

15 Claims, No Drawings

HYDROQUINONE CATALYZED OXYGEN SCAVENGER AND METHODS OF USE THEREOF

FIELD OF THE INVENTION

The present invention pertains to hydroquinone catalyzed salicylaldehyde oxygen scavenger compositions and to methods of using same. Typical methods of use of such compositions comprise use as oxygen scavengers in boiler feedwater and boiler condensate systems.

BACKGROUND

From a corrosion point of view, the presence of dissolved gases, even in small amounts, is undesirable in water systems which contact metal surfaces. For example, metal surfaces in contact with oxygen-containing industrial water can experience severe pitting. Pitting is highly concentrated corrosion affecting only a small area of the total metal surfaces. This can, however, be a serious problem causing metal failure even though only a small amount of metal is lost and the overall corrosion rate is relatively low.

With respect to oxygen, the severity of attack will depend on the concentration of dissolved oxygen in the water, water pH and temperature. As water temperature increases, as for example in a water heating system, enough driving force is added to the corrosion reaction that small amounts of dissolved oxygen in the water can cause serious problems. Oxygen pitting is considered to be a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration with steam as the purge gas. According to the pressure deaeration method for preparing boiler feedwater, the water is sprayed into a steam atmosphere and is heated to a temperature at which the solubility of oxygen in the water is low. About 95 to 99 percent of the oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is often required.

Traditional chemical oxygen scavengers include sodium sulfite and hydrazine. However, sodium sulfite cannot be safely utilized in boiler systems operating at above about 1000–1500 psi as corrosive hydrogen sulfide and sulfur dioxide can be formed at pressures above this range. Also, at these pressures, dissolved solids from the sulfite-oxygen reaction product can become a significant problem.

Hydrazine is a toxic substance and is thought to be carcinogenic. Hence, its use is undesirable.

U.S. Pat. Nos. 4,282,111 (Ciuba) and 4,278,635 (Kerst) both disclose the use of hydroquinone, per se, as an effective boiler water oxygen scavenger. Hydroquinone may be combined with mu-amines, as per U.S. Pat. Nos. 4,289,645 and 4,279,767 (of common assignment herewith) in order to provide a one drum treatment comprising oxygen scavenger and compatible neutralizing amine adapted to inhibit corrosion in the steam condensate system.

The use of hydroquinone, per se, as an oxygen scavenger, although widely accepted, has not totally solved the problem of providing enhanced oxygen corrosion protection in the steam condensate system. The hydroquinone oxygen scavenger does not readily volatilize to the extent desirable. Accordingly, it mostly remains in the liquid phase where it reacts or is finally expelled from the system with the blowdown. In order to provide oxygen based corrosion protection in the steam condensate system, it is desirable to provide an effective chemical oxygen scavenger that readily volatilizes so as to travel with produced steam through the condensate return line to provide oxygen based corrosion protection therein.

DETAILED DESCRIPTION

These and other problems in the art have been alleviated by use of the present invention, to wit: the use of a hydroquinone catalyzed salicylaldehyde oxygen scavenger.

Salicylaldehyde (2-hydroxybenzaldehyde) has a lower boiling point than hydroquinone and, a lower aqueous solubility. Further, salicylaldehyde has the potential for forming an internal hydrogen-bonded structure between the ortho hydroxyl hydrogen and aldehyde carbonyl. These properties contribute to a greater tendency for salicylaldehyde to be carried over with the steam than hydroquinone. In fact, salicylaldehyde is about ten times more volatile than hydroquinone in a 900 psig boiler and is more than twice as volatile as hydroquinone in a 1450 psig. Accordingly, it is thought that salicylaldehyde, even when fed to boiler feedwater, will afford greatly improved oxygen based corrosion protection in steam condensate lines compared to hydroquinone.

Salicylaldehyde may be prepared by heating sodium phenolate and chloroform with NaOH. It is also commercially available from severa sources.

Surprisingly, when tested alone on the moderate temperature oxygen scavenger test apparatus described in the examples, salicylaldenyde was found to be an ineffective oxygen scavenger. However, the presence of trace (catalytic) levels of hydroquinone was found to increase salicylaldehyde's oxygen scavenging efficacy by more than fifteen fold.

The hydroquinone catalyzed salicylaldehyde oxygen scavenger of the present invention may be added to any aqueous medium for which protection against oxygen based corrosion is desired. Within a boiler environment, it may be directly added to either the boiler feedwater or steam condensate system.

The amount of salicylaldehyde added could vary over a wide range and would depend on such known factors as the nature and severity of the problem being treated. It is thought that the minimum amount of salicylaldehyde compound could be about 2 parts of active compound per million parts of aqueous medium being treated. The preferred minimum is about 20 parts per million. It is believed that the salicylaldehyde scavenger feed could be as high as 200 parts per million with about 100 parts per million being the preferred maximum.

In general aqueous systems where the treatment does not have the benefit of elevated water temperature, it is preferred that the water be of alkaline pH, e.g., greater than about 7.5. In treating boiler feedwater, it is preferred that once the water reaches the boiler proper, it has an alkaline pH, which is always the case for boilers operating within the ASME guidelines.

In treating boiler feedwater, it is a well known fact that oxygen can get into the boiler from other sources. Accordingly, in keeping with standard practices, an excess amount of the hydroquinone catalyzed salicylaldehyde oxygen scavenger should be used to provide a residual amount thereof in the boiler water for the uptake of oxygen from other sources.

The use of catalytic amounts of hydroquinone in conjunction with salicylaldehyde is essential. Such catalytic amount may fall within the range of 0.4 parts to about 40 parts per billion parts of aqueous medium treated. A preferred catalytic range is from 4 ppb to 20 ppb.

Neutralizing amines, which are adapted to neutralize acidity in the condensate system, may be combined with the hydroquinone catalyzed salicylaldehyde oxygen scavenger in order to provide a commercially attractive one drum boiler treatment product. Such neutralizing amines may be selected from: diethylaminoethanol, 2-amino-2-methyl-1-propanol, methoxypropylamine, dimethylpropanol amine, ammonia etc. It is desirable to feed such neutralizing amines to the boiler system in amount of from about 0.1 ppm to 50 ppm, with 0.5 ppm to 10 ppm being preferred.

Exemplary compositions in accordance with the invention are (percentages based upon weight):
salicylaldehyde from 0.25% to 1.2%
hydroquinone from 0.00005% to 0.00024%
neutralizing amine from 0.0125% to 0.30% (when present)
remainder water.

Preferred compositions are within the following ranges:
salicylaldenyde from 0.5% to 1.0%
hydroquinone from 0.0001% to 0.0002%
neutralizing amine from 0.05% to 0.10% (when present)
remainder water.

The invention will be further illustrated by the following examples which are included as being illustrative of the invention and which should not be construed as limiting the scope thereof.

EXAMPLES

In order to demonstrate efficacy of the hydroquinone catalyzed salicylaldehyde oxygen scavengers of the present invention, oxygen scavenging tests were conducted under conditions of elevated temperature and pressure. The test apparatus used was essentially a stainless steel hot water flow system equipped with appropriate monitoring instrumentation. Demineralized feedwater, adjusted to the appropriate initial dissolved oxygen level (controlled by nitrogen sparging), was pumped from a reservoir at ambient temperature into a once-through heater. Temperature was monitored continuously by means of thermocouples at several locations along the length of the flow tubing. A solution containing the oxygen scavenger test material was loaded into a pump driven syringe and fed continuously to the heated flow stream through a port. pH was controlled by continuous injection of base via a syringe pump upstream of the oxygen scavenger feed point. The feedwater containing dissolved oxygen and the test material then traversed the flow tubing via a by-pass comprising an additional length of coiled tubing. Contact (or reaction) time of the test material and dissolved oxygen was governed by the choice of coil length and flow rate. The tendency of the temperature to drop during residence in the coiled tubing was offset by the use of thermostatted heating tapes which maintained the temperature in this tubing at 190° F. Upon exiting the coiled tubing, the stream flowed through a sample cooler to render the temperature of the liquid compatible with the operating range of a membrane-type dissolved oxygen probe. The cooled liquid was analyzed for dissolved oxygen via a D.O flow cell, and pH was potentiometrically monitored in the flow tube immediately downstream of the D.O. probe. Outputs of the temperature, pH and dissolved oxygen probes during operation were monitored via strip chart recorders. The final destination of the reaction mixture was a reservoir which could be drained for analysis of reaction products, if desired.

A suitable set of operating conditions were found which were not extremely different from those experienced in boiler feedwater systems and which did not result in experimental uncertainties. A flow rate of 300 mL/min. through the apparatus was chosen, since this yielded the optimum response of the dissolved oxygen probe. Temperature in the system could be maintained at 19°±5° F. under 14±1 psig. Residence time of the feedwater in the flow tube from chemical feed point to D.O flow cell outlet was 4±0.2 minutes. Approximately 3.5 minutes of this total was spent in a 40' length of 0.402 inch i.d. coiled tubing. Entry into and residence in the sample cooler accounted for 0.5 minute of the total contact time.

The test solutions were prepared by initially mixing the oxygen scavenging formulations with demineralized water. The pH of each of the thus prepared stock solutions was adjusted to 13.4 with 7N NaOH. The NaOH addition was necessary in order to effect solubilization of tne salicylaldehyde. Solubility of salicylaldehyde in neutral solutions is about 1%. Uncertainies in measured oxygen concentrations were about 5 ppb.

The results obtained are reported herein in Table I.

TABLE I

| Composition of Aqueous Solution | Stock Solution Concen. | Feedwater Concen. (ppm Actives) | Reaction pH | Initial Oxygen (ppb) | Final Oxygen (ppb) | % Oxygen moval |
|---|---|---|---|---|---|---|
| Salicylaldehyde | 18.2% | 960 | 11.5 | 470 | 455 | 3.2 |
| Hydroquinone | 0.0037% | 0.2 | 11.5 | 490 | 435 | 11.2 |
| Salicylaldehyde & Hydroquinone | 18.2% 0.0037% | 960 0.2 | 11.5 | 480 | 190 | 60.4 |

*Oxygen Scavenging Results for 4 Minute Reaction Time at 140° F. and 14 psig*

Additional experiments were conducted with the above-described apparatus in order to ascertain if salicylaldehyde would catalyze hydroquinone. The following formulations were tested.

"A"
10% methoxypropylamine
9% hydroquinone
1% salicylaldehyde
remainder water

"B"
10% methoxypropylamine
10% hydroquinone
remainder water

"C"

"D"

| | |
|---|---|
| 2.25% hydroquinone | 2.5% hydroquinone |
| 0.25% salicylaldehyde | 100 ppm methoxpropylamine |
| 100 ppm methoxypropylamine | remainder water |
| remainder water | |

Within the realm of experimental error, compositions A and B scavenged almost identically the same amount of oxygen. Similarly, compositions C & D scavenged almost identically. Accordingly, it is apparent that salicylaldehyde does not act as a catalyst for the hydroquinone oxygen scavenging reaction. Suprisingly, as Table I indicates, hydroquinone does catalyze the salicylaldehyde oxygen scavenging reaction.

While the invention has been described hereinabove with respect to specific embodiments of same, such are not intended to limit the scope of the invention. The invention is intended to cover any eqivalents, modifications, etc., and is to be limited solely by the scope of the appended claims.

I claim:

1. Oxygen scavenging composition comprising: (a) salicylaldehyde, and a catalytically effective amount of (b) hydroquinone.

2. Composition as defined in claim 1 further comprising a (c) neutralizing amine, the weight ratio of (a):(b):(c) being within the range of 1: 0.001 to 0.00004:1.2 to 0.01.

3. Composition as defined in claim 2 further comprising water.

4. Composition as defined in claim 2 wherein said neutralizing amine comprises a member or members selected from the group consisting of methoxypropylamine, diethylaminoethanol, dimethylpropanolamine, 2-amine-2-methyl-1-propanol and ammonia.

5. A method for reducing the amount of oxygen in an aqueous medium comprising adding to said medium an effective amount for the purpose of a treatment comprising salicylaldehyde and a catalytic amount of hydroquinone.

6. A method as recited in claim 5 wherein said treatment comprises an aqueous solution.

7. A method as recited in claim 5 wherein said treatment is admitted in an amount sufficient to provide in said aqueous medium from about 2 to 200 parts of salicylaldehyde and from about 0.0004 to 0.040 parts hydroquinone, per million parts of said aqueous medium.

8. A method as recited in claim 7 further comprising adding a neutralizing amine to said aqueous medium in an amount of from about 0.1 to 50 parts of said neutralizing amine based upon one million parts of said aqueous medium.

9. A method as recited in claim 8 wherein said neutralizing amine comprises a member or members selected from the group consisting of methoxypropylamine, diethylaminoethanol, dimethylpropanolamine, 2-amino-2-methyl-1-propanol and ammonia.

10. A method as recited in claim 9 wherein said neutralizing amine comprises methoxypropylamine.

11. A method as recited in claim 5 wherein said aqueous medium comprises feedwater to a boiler.

12. A method as recited in claim 5 wherein said aqueous medium comprises condensed steam in a boiler condensate system.

13. A method as recited in claim in 5 wherein said aqueous medium has an alkaline pH.

14. A method as recited in claim 13 wherein said pH is about 8 or greater.

15. A method as recited in claim 8 wherein said solution is an aqueous solution and wherein said neutralizing amine comprises methoxypropylamine.

* * * * *